US010028255B2

(12) United States Patent
Emeott et al.

(10) Patent No.: US 10,028,255 B2
(45) Date of Patent: Jul. 17, 2018

(54) DELIVERING DATA TO A WIRELESS STATION (71) Applicant: Google Technology Holdings LLC, Mountain View, CA (US)

(72) Inventors: Stephen P. Emeott, Rolling Meadows, IL (US); Murali Narasimha, Vernon Hills, IL (US); Dwight R. Smith, Grapevine, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/629,179

(22) Filed: Jun. 21, 2017

(65) Prior Publication Data

US 2017/0289909 A1 Oct. 5, 2017

Related U.S. Application Data (62) Division of application No. 14/845,726, filed on Sep. 4, 2015, now Pat. No. 9,717,050, which is a division
(Continued)

(51) Int. Cl.
H04W 72/02 (2009.01)
H04W 52/02 (2009.01)
(Continued)

(52) U.S. Cl.
CPC ............ H04W 72/02 (2013.01); H04B 1/713 (2013.01); H04B 1/7156 (2013.01);
(Continued)

(58) Field of Classification Search
CPC ..... H04W 36/36; H04W 60/00; H04W 72/02; H04W 88/02
See application file for complete search history.

(56) References Cited

U.S. PATENT DOCUMENTS 6,751,456 B2 * 6/2004 Bilgic ................... H04W 88/02
455/418
7,809,009 B2 * 10/2010 Tatar ................... H04L 49/1546
370/389
(Continued)

FOREIGN PATENT DOCUMENTS

CN 1998162 A 7/2007
CN 101610569 A 12/2009
(Continued)

OTHER PUBLICATIONS

Patent Cooperation Treaty, International Search Report and Written Opinion of the International Searching Authority for International Application No. PCT/US2013/071567 (CS39594), dated Mar. 6, 2014, 11 pages.
(Continued)

Primary Examiner — Raj Jain
(74) Attorney, Agent, or Firm — Lerner, David, Littenberg, Krumholz & Mentlik, LLP (57) ABSTRACT Disclosed are methods for delivering data (212) to a wireless station (102). An access point (104), or any other suitable device or system, receives a plurality of association requests (204) from a plurality of wireless stations (102) and transmits a different association identifier (208) to each of the plurality of wireless stations (102). The access point (104) buffers data (212) for a subset of the wireless stations (102). If the number of wireless stations (102) with buffered data (212) at the access point (104) is less than a threshold, then the access point (104) transmits a list of association identifiers indicating that buffered data (212) are held for each wireless station (102) identified by the list. If the number of wireless stations (102) with buffered data (212) at the access point (104) is not less than the threshold, then the access point (104) transmits data indicative of a range of associa-
(Continued)

tion identifiers indicating that buffered data (212) are held for at least one wireless station (102) identified by the range.

1 Claim, 8 Drawing Sheets

Related U.S. Application Data of application No. 14/086,007, filed on Nov. 21, 2013, now Pat. No. 9,503,979.

(60) Provisional application No. 61/731,566, filed on Nov. 30, 2012.

(51) Int. Cl.

| | | |
|---|---|---|
| *H04W 74/04* | (2009.01) | |
| *H04B 1/7156* | (2011.01) | |
| *H04B 1/713* | (2011.01) | |
| *H04W 68/02* | (2009.01) | |
| *H04W 72/04* | (2009.01) | |
| *H04W 74/06* | (2009.01) | |
| *H04L 12/24* | (2006.01) | |
| *H04W 74/08* | (2009.01) | |
| *H04L 29/12* | (2006.01) | |
| *H04W 76/04* | (2009.01) | |
| *H04W 88/08* | (2009.01) | |

(52) U.S. Cl.
CPC ... *H04W 52/0206* (2013.01); *H04W 52/0216* (2013.01); *H04W 52/0219* (2013.01); *H04W 68/025* (2013.01); *H04W 72/04* (2013.01); *H04W 74/04* (2013.01); *H04W 74/06* (2013.01); *H04L 29/12018* (2013.01); *H04L 41/5003* (2013.01); *H04W 74/0816* (2013.01); *H04W 76/048* (2013.01); *H04W 88/08* (2013.01); *Y02B 60/50* (2013.01)

(56) References Cited

U.S. PATENT DOCUMENTS

| | | | |
|---|---|---|---|
| 8,089,908 | B2 | 1/2012 | Wentink |
| 9,019,874 | B2 | 4/2015 | Choudhury et al. |
| 2002/0071478 | A1* | 6/2002 | Cornwall ............... H04B 1/713 375/132 |
| 2004/0246983 | A1 | 12/2004 | Kaatz |
| 2005/0122936 | A1 | 6/2005 | Son et al. |
| 2006/0062181 | A1* | 3/2006 | Chou .................. H04L 41/5003 370/329 |
| 2010/0265864 | A1 | 10/2010 | He et al. |
| 2012/0063335 | A1 | 3/2012 | Cho et al. |
| 2014/0003414 | A1* | 1/2014 | Choudhury ......... H04W 74/006 370/347 |

FOREIGN PATENT DOCUMENTS

| | | |
|---|---|---|
| CN | 101861715 | 10/2010 |
| EP | 1499144 A1 | 1/2005 |
| WO | 2005046085 A1 | 5/2005 |

OTHER PUBLICATIONS

Suhwook Kim, LG Electronics, Association ID management for TGah, doc.: IEEE 802.11-11/0088r1, Jan. 2011, all pages.
MediaTek, Inc.: "Supporting Large Number of STAs in 802.11ah", doc.: IEEE 802.11-11-825r1, May 2011, Date May 9, 2011, all pages.
Lander, Lei et al.: "Extension of AID and TIM to Support 6000 STAs in 802.11 ah", doc.—IEEE 802.11-11/1550r1, Nov. 8, 2011, all pages.
Examination Report for European Patent Application No. 13802804.8, dated Dec. 5, 2016.
Notification of First Office Action for Chinese Patent Application No. 201380061817.3 dated Oct. 10, 2017.

* cited by examiner

FIG. 8 even just a portion of the population of wireless stations.

DELIVERING DATA TO A WIRELESS STATION

CROSS-REFERENCE TO RELATED APPLICATIONS

The present application is a divisional of U.S. patent application Ser. No. 14/845,726, filed on Sep. 4, 2015, which is a divisional of U.S. patent application Ser. No. 14/086,007, filed on Nov. 21, 2013, issued as U.S. Pat. No. 9,503,979, which claims priority to U.S. Provisional Application No. 61/731,566, filed on Nov. 30, 2012, the disclosures of which are hereby incorporated herein by reference.

TECHNICAL FIELD

The present disclosure is related generally to wireless signals and, more particularly, to delivering data to a wireless station.

BACKGROUND

Wireless sensors are used in a variety of applications such as reading gas meters, monitoring temperatures, etc. These wireless sensors are often placed in locations where they cannot be plugged in to a wired power source and therefore must rely on battery power for long periods of time. To conserve battery power, these devices typically go into a low-power mode between measurements and communications.

Often, these wireless sensors communicate with an application server via an access point (e.g., a Wi-Fi router). An access point is a device that allows wireless devices, such as wireless sensors, to connect to a wired network, such as the Internet. Typically, each time the application server sends data to a wireless sensor, the data are first buffered by the associated access point until the wireless device comes out of low-power mode.

When a wireless station comes out of low-power mode, the access point lets the wireless station know that the access point has buffered data for that wireless station. Typically, the access point does this by broadcasting a unique identifier associated with each such wireless station. However, if large number of wireless devices (e.g., thousands of sensors deployed in a building) require frequent updates, the list of unique identifiers is long. As a result, each wireless device may need to stay awake for extended periods of time, thereby reducing battery life.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Briefly, in a specific embodiment, a Wi-Fi router receives a plurality of connection requests from a plurality of gas or electric utility meters. In response, the Wi-Fi router transmits a unique identifier to each of the meters. Because the wireless meters are typically battery powered and cycling in and out of a sleep mode, the Wi-Fi router buffers data coming from a utility company for the wireless meters (e.g., a firmware update). If the number of meters with buffered data at the Wi-Fi router is relatively low, then the Wi-Fi router transmits an explicit list of meter identifiers indicating that buffered data are held for each meter identified by the list. However, if the number of meters with buffered data at the Wi-Fi router is relatively high, then the Wi-Fi router transmits data indicative of a range of meter identifiers indicating that buffered data may be held for each meter identified by the range. By varying the addressing scheme used based on the number of meters that have buffered data waiting at the Wi-Fi router, overall battery life of the collection of meters is conserved.

More generally, methods and apparatus for delivering data to a wireless station are disclosed. In an embodiment, an access point, or any other suitable device or system, receives a plurality of association requests from a plurality of wireless stations and transmits a different association identifier to each of the plurality of wireless stations. Because the wireless stations are typically battery powered and cycling in and out of a sleep mode, the access point buffers data coming from one or more application servers for the wireless stations. If the number of wireless stations with buffered data at the access point is less than a threshold, then the access point transmits an explicit list of association identifiers indicating that buffered data are held for each wireless station identified by the list. However, if the number of wireless stations with buffered data at the access point is not less than the threshold, then the access point transmits data indicative of a range of association identifiers indicating that buffered data may be held for each wireless station identified by the range.

Among other advantages, transmitting a range of association identifiers when the number of wireless stations with buffered data at the access point is large allows the wake-up message to be short, thereby reducing the number of signaling intervals needed to notify a large population of wireless stations that buffered data are held by the access point. Conversely, transmitting an explicit list of association identifiers when the number of wireless stations with buffered data is short maximizes the number of wireless stations from amongst a large population of wireless stations that may be notified during a single signaling attempt, thereby avoiding notification delays occurring when sparse bitmaps are sent in different signaling intervals to wake up a batch of wireless stations with dissimilar low-power association identifiers and dissimilar wake-up periods.

Another improvement arises when the stations can request, via a skip-rate value in the association request, a degree of sleeping that the station is to utilize. The access point can then schedule the station to the requested skip-rate value or an alternate value in conjunction with an offset value to allow the station to determine which data delivery periods the station should look for an address of the station to be presented in the address list schemes presented herein. To synchronize the signal periods, the access point transmits a skip-rate count with every data-delivery beacon. Stations can then determine their next period of delivery by taking the broadcast skip-rate counter value and performing a modulo operation with the assigned skip rate and comparing the remainder with the assigned offset value. This permits the access point to balance the station delivery periods over a number of sequential delivery periods while permitting to the stations extended sleep intervals.

In one example, a controller is structured to transmit polling information to indicate that each wireless station identified by the list should poll for the buffered data. In one example, the controller is structured to transmit schedule information indicating that each wireless station identified by the range should wake up at a scheduled wake-up time to begin receiving an associated portion of the buffered data. In one example, the scheduled wake-up time is responsive to a delivery interval. In one example, the controller is structured to transmit a skip-rate counter for each delivery beacon. Based on the value of this skip-rate counter, the controller is able to consider for inclusion those stations that have computationally correct skip rate and offset values that have buffered data availability and a synchronization point associated with at least one of the plurality of wireless stations. For example, a skip-rate counter of 67 indicates that data for stations with a skip rate of 8 and offset 3 are included in the delivery period. In that same period, devices with buffered data with a skip rate of 12 and an offset of 7 are similarly included. In one example, the controller is structured to transmit a skip-rate counter to be used by the wireless station by matching the offset value and the remainder of the skip-rate counter modulo the skip rate. In one example, reporting buffered data availability is limited to wireless stations that have a skip rate and an offset value aligned with a current cycle value. In one example, the controller is structured to receive a request from a wireless station to modify the skip rate, modify the offset value, and transmit the modified skip rate and the modified offset value to the wireless station. In one example, the controller is structured to determine that the number of wireless stations is greater than the threshold, and, in response, cause the transmitter to also transmit an indication that at least one wireless station in the range need not wake up at the scheduled time to receive buffered data. In one example, the controller is structured to cause the transmitter to transmit at least one low-power association identifier and at least one non-low-power association identifier. In one example, the controller is structured to cause the transmitter to transmit a delivery interval time indicative of a time between a transmission of first buffered data associated with a first wireless station and a transmission of second buffered data associated with a second wireless station. In one example, the controller is structured to cause the transmitter to transmit a skip rate indicative of a wake-up frequency associated with at least one of the plurality of wireless stations.

Figure 1:
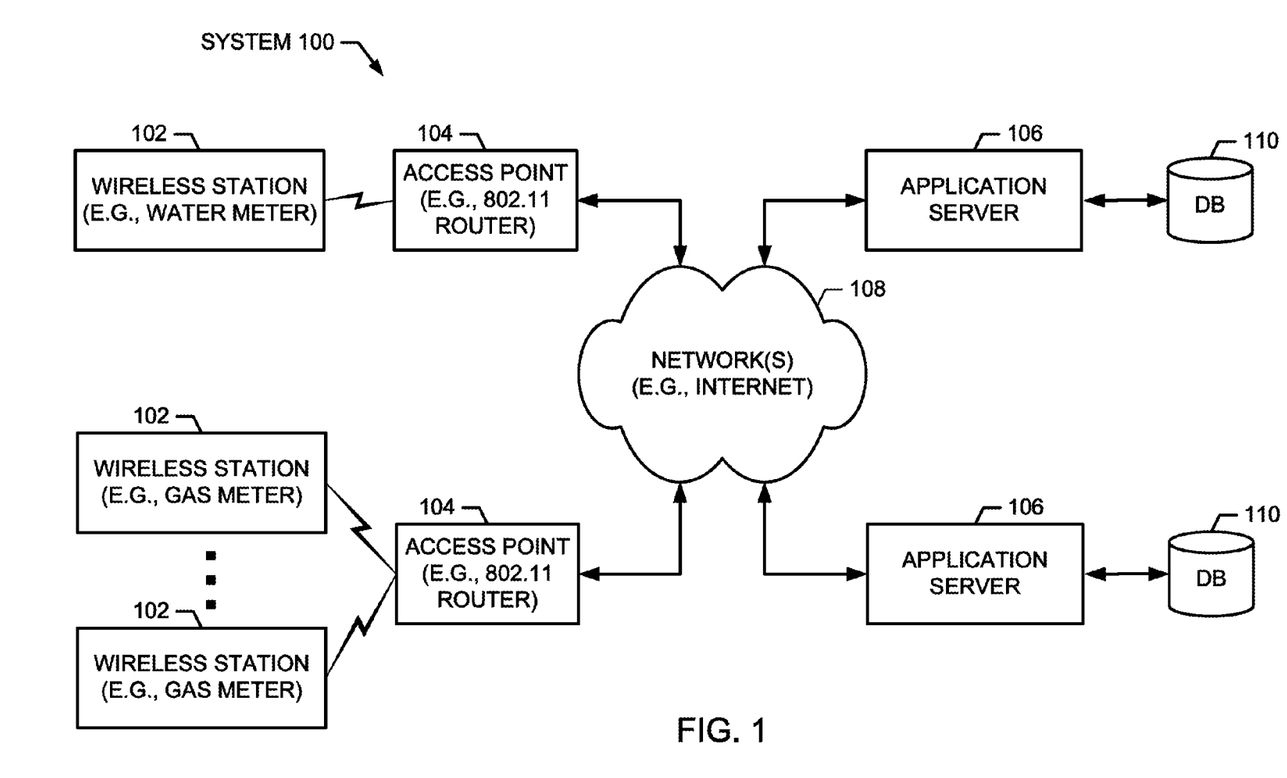
FIG. 1 is a block diagram of an example wireless network communication system.

Turning now to the drawings, and as described in detail below, one example of the presently disclosed system is realized in a wireless network communications system, although any suitable communication system may be employed. A block diagram of an exemplary wireless network communications system 100 is illustrated in FIG. 1. The example system 100 includes a plurality of wireless stations 102 which wirelessly communicate with a plurality of associated access points 104. In one example, the access point 104 is an 802.11-type router. Each access point 104 connects one or more wireless stations 102 to one or more application servers 106 via a network 108.

Each wireless station 102 may be any suitable type of wireless device. In an example, the wireless station 102 is a sensor structured to take one or more types of physical measurements such as temperature, sound, pressure, humidity, light, gas flow, liquid flow, heart rate, etc. The wireless station 102 may be connected to an AC power source or the wireless station 102 may be battery powered. In an example, a plurality of battery-powered water-meter readers are placed in a neighborhood to periodically send water-meter readings to an application server 106 for storage in a database 110.

If the wireless station 102 is battery powered, then the wireless station 102 may periodically enter a low-power (sleep) mode where a receiver or other portions of the wireless station 102 may be powered down to conserve the battery. In such an instance, the access point 104 associated with the wireless station 102 may transmit a beacon indicating when data are buffered for the wireless station 102 as described in detail below.

Figure 2:
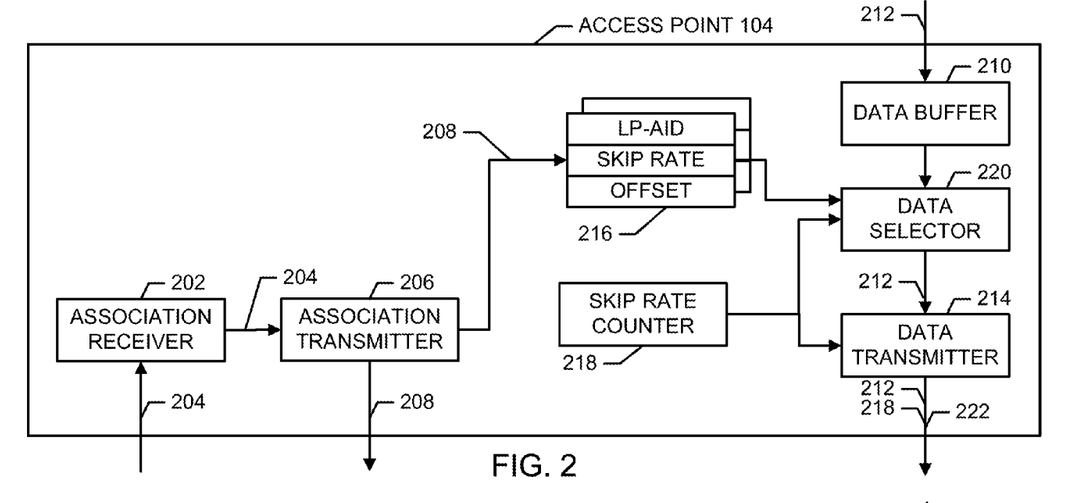
FIG. 2 is a block diagram of portions of an example access point.

A diagram of portions of an example access point 104 for delivering data to a wireless station 102 is illustrated in FIG. 2. The access point 104 may be implemented in hardware or a combination of hardware and hardware executing software. In one embodiment, at least a portion of the wireless device 102 is embodied in a CPU executing software. Other suitable hardware includes one or more application-specific integrated circuits, state machines, field-programmable gate arrays, or digital signal processors.

In this example, an association receiver 202 receives a plurality of association requests 204 from a plurality of wireless stations 102. For example, 2000 gas meters and 2000 water meters may all attempt to link to a particular access point 104. An association transmitter 206, operatively coupled to the association receiver 202, then transmits a different association identifier in the association response 208 to each of the plurality of wireless stations 102. In one example, the access point 104 assigns each gas meter and each water meter a unique low-power ID. In addition, when the skip-rate feature is used, the association request 204 optionally includes a requested skip rate, and the association transmitter 206 optionally includes the same or a different value for an assigned skip rate and an offset value in the association response 208.

The access point 104 maintains a list 216 of stations to permit it to hold the assigned association identifiers, skip rates, and offsets. It builds this list 216 as it assigns these values in the association responses 208.

A data buffer 210 buffers data 212 for a subset of the plurality of wireless stations 102. For example, all of the water meters may need a firmware update, or a few water meters may need new instructions. For each delivery, a skip-rate counter 218 is updated and used in conjunction with the list of stations 216 in a data selector 220 to select the buffers of those wireless stations 102 that will be looking at the delivery beacon by computing the relevant modulo function for each of the plurality of wireless stations 102 and selecting those with matching offsets. Before transmitting the selected buffered data 212 to the wireless stations 102, the access point 104 determines if the number of wireless stations 102 with buffered data 212 is less than a certain threshold. For example, the access point 104 may determine that more than or less than 50 meters have buffered data 212 at the access point 104.

If the number of selected wireless stations 102 with buffered data 212 at the access point 104 is less than the threshold, then a data transmitter 214, operatively coupled to the skip-rate counter 218 and to the data selector 220 transmits a list of association identifiers 222 indicating that buffered data 212 are held for each wireless station 102 identified by the list. In an example, the data transmitter 214 explicitly lists the low-power ID for all meters that need an update and indicates that each such wireless station 102 should poll for its buffered data. When the number of selected wireless stations 102 with buffered data 212 at the access point 104 is less than the threshold, the number of bits required to transmit a list of association identifiers can be significantly less than the number of bits required to transmit a bitmap. For example, the maximum length of a TIM bitmap in the IEEE 802.11 standard is 2008 bits, whereas transmitting 50 sixteen-bit low-power identifiers requires an 800-bit list, and these identifiers may represent a population of wireless stations far exceeding 2008.

If the number of selected wireless stations 102 with buffered data 212 at the access point 104 is not less than the threshold, then the data transmitter 214 transmits data indicative of a range of association identifiers indicating that buffered data 212 are held for each wireless station 102 identified by the range. In an example, the data transmitter 214 sends the association identifiers 222 for the bottom and the top of one or more ranges of meters, not all of which necessarily have buffered data 212, and indicates that each such wireless station 102 should wake up at a scheduled time to receive its buffered data 212, if any. In another embodiment, the data transmitter 214 sends bitmaps for one or more ranges of low-power association identifiers indicating which stations have buffered data. Wireless stations 102 receiving a bitmap and having no data to receive may remain in sleep mode instead of waking up.

Figure 3:
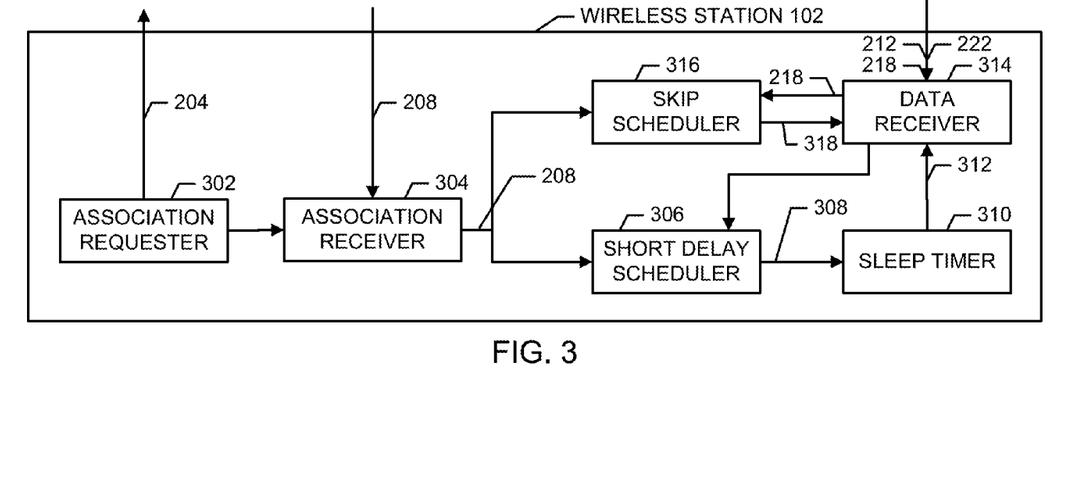
FIG. 3 is a block diagram of portions of an example wireless station.

A block diagram of portions of an example wireless station 102 is illustrated in FIG. 3. The wireless station 102 may be implemented in hardware or a combination of hardware and software according to the possibilities described above with reference to the access point 104.

In this example, the wireless station 102 includes an association requester 302 operatively coupled to an association receiver 304. The association requester 302 transmits an association request 204, which optionally includes a requested skip rate, to an access point 104, and the association receiver 304 receives an association identifier, skip rate, and offset values in the association response 208 from the access point 104. Subsequently, when the access point 104 needs to indicate that it has buffered data 212 for one or more wireless stations 102, the access point 104 may transmit an explicit list of association identifiers 222 (e.g., when the list is relatively short), or the access point 104 may transmit the boundaries of one or more ranges of association identifiers 222 (e.g., when the list is relatively long). In one example, when transmitting the boundaries of the one or more ranges of association identifiers, the access point 104 identifies a range using a bottom low-power ID and a value indicating the number of wireless stations in the bitmap. In another example, the access point 104 identifies a range using a bottom and a top low-power ID.

Accordingly, if the association identifier from the association response 208 associated with a wireless station 102 is in a range of association identifiers 222 indicated by the access point 104, then a short-delay scheduler 306 operatively coupled to the association receiver 304 programs a sleep timer 310 operatively coupled to the short-delay scheduler 306, with a wake-up time 308, and the wireless station 102 enters a power-save (sleep) mode to conserve battery power until the earliest time that the buffered data 212 for that wireless station 102 may start being transmitted. For example, the range may include hundreds of wireless stations 102 each of which has buffered data 212. The sleep timer 310 then wakes 312 the wireless station 102 up from the power-save mode at or before the scheduled time in order to start monitoring for the buffered data 212 with its address from the access point 104 via a data receiver 314 operatively coupled to the sleep timer 310. Alternatively, if the association identifier from the association response 208 associated with a wireless station 102 is in a range of association identifiers 222 indicated by the access point 104, and the access point 104 does not provide a schedule, then the short-delay scheduler 306, which is operatively coupled to the association receiver 304, wakes up the wireless station and transmits a poll message to the access point 104 requesting the immediate delivery of buffered data. If the association identifier from the association response 208 associated with a wireless station 102 is in an explicit list of association identifiers 222 received from the access point 104, then the wireless station 102 may poll the access point 104 for the buffered data 212.

Where the association response 208 includes a skip rate and offset, the wireless station 102 may use these values in a skip scheduler 316. The skip scheduler 316 may monitor the skip-rate counter 218 value received from the data receiver 314 to determine when the next expected delivery period may occur and inform the data receiver 314 with an appropriate skip indication 318. This permits the data receiver 314 to shut down until the next expected delivery period.

Figure 4:
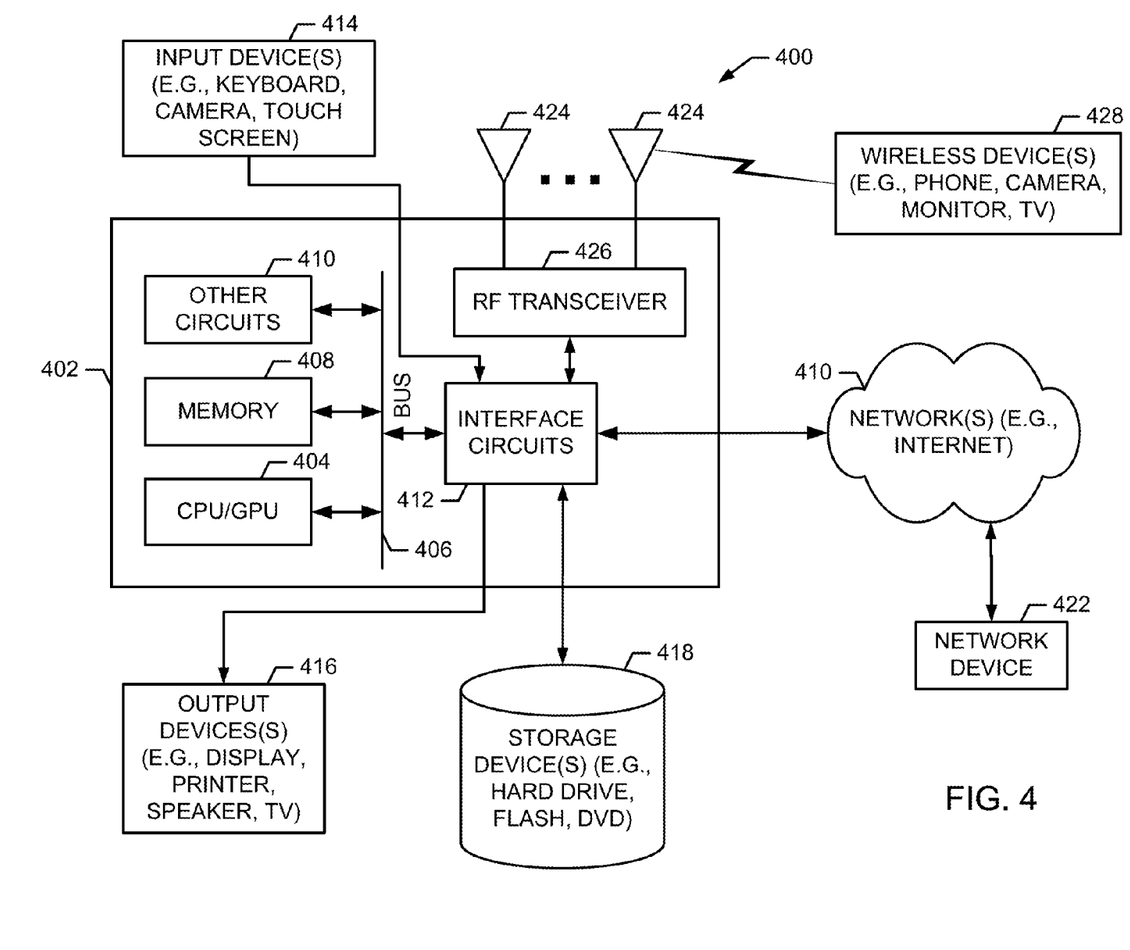
FIG. 4 is a block diagram of an example computing device.

A block diagram of an example computing device 400 that may be used to transmit or receive data to or from a wireless station 102 is illustrated in FIG. 4. For example, the computing device 400 may be a wireless station 102, an access point 104, or any other suitable device.

The example electrical device 400 includes a main unit 402 which may include, if desired, one or more processors 404 electrically coupled by an address/data bus 406 to one or more memories 408, other computer circuitry 410, and one or more interface circuits 412. The processor 404 may be any suitable processor or plurality of processors. For example, the electrical device 400 may include a CPU or a graphics processing unit. The memory 408 may include various types of non-transitory memory including volatile memory or non-volatile memory such as, but not limited to, distributed memory, read-only memory, random-access memory, etc. The memory 408 typically stores a software program that interacts with the other devices in the system as described herein. This program may be executed by the processor 404 in any suitable manner. The memory 408 may also store digital data indicative of documents, files, programs, web pages, etc., retrieved from a server or loaded via an input device 414.

The interface circuit 412 may be implemented using any suitable interface standard, such as an Ethernet interface or a Universal Serial Bus interface. One or more input devices 414 may be connected to the interface circuit 412 for entering data and commands into the main unit 402. For example, the input device 414 may be a keyboard, mouse, touch screen, track pad, isopoint, camera, or a voice-recognition system.

One or more displays, printers, speakers, monitors, televisions, high-definition televisions, or other suitable output devices 416 may also be connected to the main unit 402 via the interface circuit 412. The display 416 may be a cathode ray tube, liquid crystal display, or any other type of suitable display. The display 416 generates visual displays of data generated during operation of the device 400. For example, the display 416 may be used to display web pages or other content received from a server. The visual displays may include prompts for human input, run-time statistics, calculated values, data, etc.

One or more storage devices 418 may also be connected to the main unit 402 via the interface circuit 412. For example, a hard drive, CD drive, DVD drive, or other storage device may be connected to the main unit 402. The storage devices 418 may store any type of data used by the device 400.

The electrical device 400 may also exchange data with other network devices 422 via a connection to a network. The network connection may be any type of network connection, such as an Ethernet connection, digital subscriber line, telephone line, coaxial cable, etc. Users of the system may be required to register with a server. In such an instance, each user may choose a user identifier (e.g., e-mail address) and a password which may be required for the activation of services. The user identifier and password may be passed across the network using encryption built into the user's browser. Alternatively, the user identifier or password may be assigned by the server.

In some embodiments, the device 400 is a wireless device. In such an instance, the device 400 may include one or more antennas 424 connected to one or more radio frequency transceivers 426. The transceiver 426 may include one or more receivers and one or more transmitters. For example, the transceiver 426 may be a cellular transceiver. The transceiver 426 allows the device 400 to exchange signals, such as voice, video, and data, with other wireless devices 428, such as a phone, camera, monitor, television, or high-definition television. For example, the device may send and receive wireless telephone signals, text messages, audio signals, and video signals.

Figure 5:
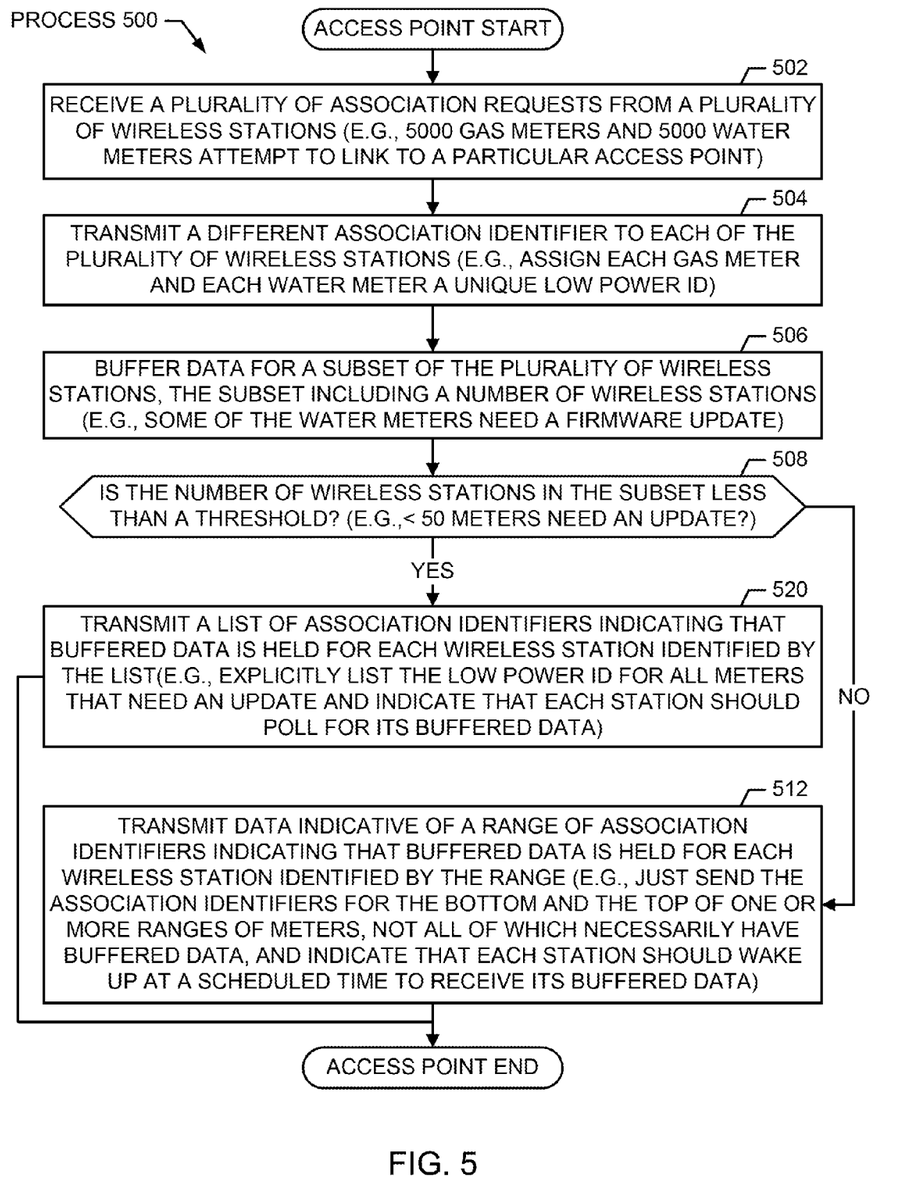
FIG. 5 is a flowchart of an example process for delivering data to a wireless station.

A flowchart of an example process 500 for delivering data to a wireless station 102 is illustrated in FIG. 5. The process 500 may be carried out by one or more suitably programmed controllers or processors executing software (e.g., block 404 of FIG. 4). The process 500 may also be embodied in hardware or a combination of hardware and software according to the possibilities described above with reference to the access point 104. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In general, an access point 104, or any other suitable device or system, receives a plurality of association requests from a plurality of wireless stations 102 and transmits a different association identifier to each of the plurality of wireless stations 102. Because the wireless stations 102 are typically battery powered and cycling in and out of a sleep mode, the access point 104 buffers data coming from one or more application servers 106 for the wireless stations 102. If the number of wireless stations 102 with buffered data at the access point 104 is less than a threshold, then the access point 104 transmits a list of association identifiers indicating that buffered data are held for each wireless station 102 identified by the list. If the number of wireless stations 102 with buffered data at the access point 104 is not less than the threshold, then the access point 104 transmits data indicative of a range of association identifiers indicating that buffered data may be held for each wireless station 102 identified by the range.

More specifically, the example process 500 begins when an access point 104, or any other suitable device or system, receives a plurality of association requests from a plurality of wireless stations 102 (block 502). For example, 3000 gas meters and 3000 water meters may all attempt to link to a particular access point 104. The access point 104 then transmits a different association identifier to each of the plurality of wireless stations 102 (block 504). In an example, the access point 104 assigns each gas meter and each water meter a unique low-power ID. As an example of how the order of some steps may be changed, it will be appreciated that the access point 104 may transmit an association identifier to one wireless station 102 (block 504) and then, subsequently, receive an association request from another wireless station 102.

The access point 104 buffers data for a subset of the plurality of wireless stations 102, the subset including a number of wireless stations 102 (block 506). For example, all of the water meters may need a firmware update or a few water meters may need new instructions. Before transmitting the buffered data to the wireless stations 102, the access point 104 determines if the number of wireless stations 102 with buffered data is less than a certain threshold (block 508). For example, the access point 104 may determine that more than or less than 100 meters have buffered data at the access point 104.

If the number of wireless stations 102 with buffered data at the access point 104 is less than the threshold, then the access point 104 transmits a list of association identifiers indicating that buffered data are held for each wireless station 102 identified by the list (block 520). In an example, the access point 104 explicitly lists the low-power ID of all of the meters that need an update and indicates that each such wireless station 102 should poll for its buffered data.

If the number of wireless stations 102 with buffered data at the access point 104 is not less than the threshold, then the access point 104 transmits data indicative of a range of association identifiers indicating that buffered data may be held for each wireless station 102 identified by the range (block 512). In an example, the access point 104 sends the association identifiers for the bottom and the top of one or more ranges of meters, not all of which necessarily have buffered data, and indicates that each such wireless station 102 should wake up at a scheduled time to receive its buffered data, if any.

Figure 6:
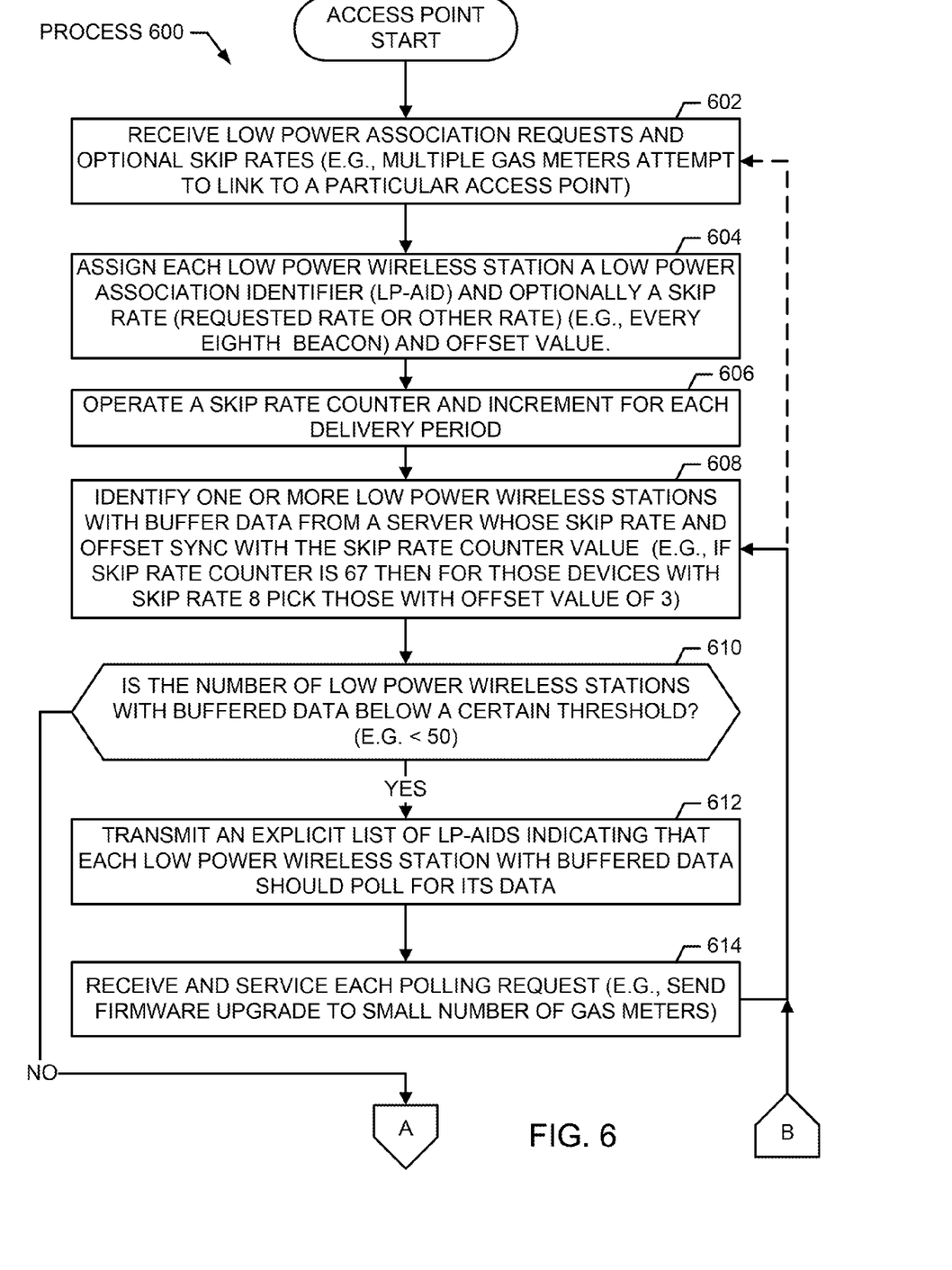
FIGS. 6 and 7 together form a flowchart of another example process for delivering data to a wireless station.
Figure 7:
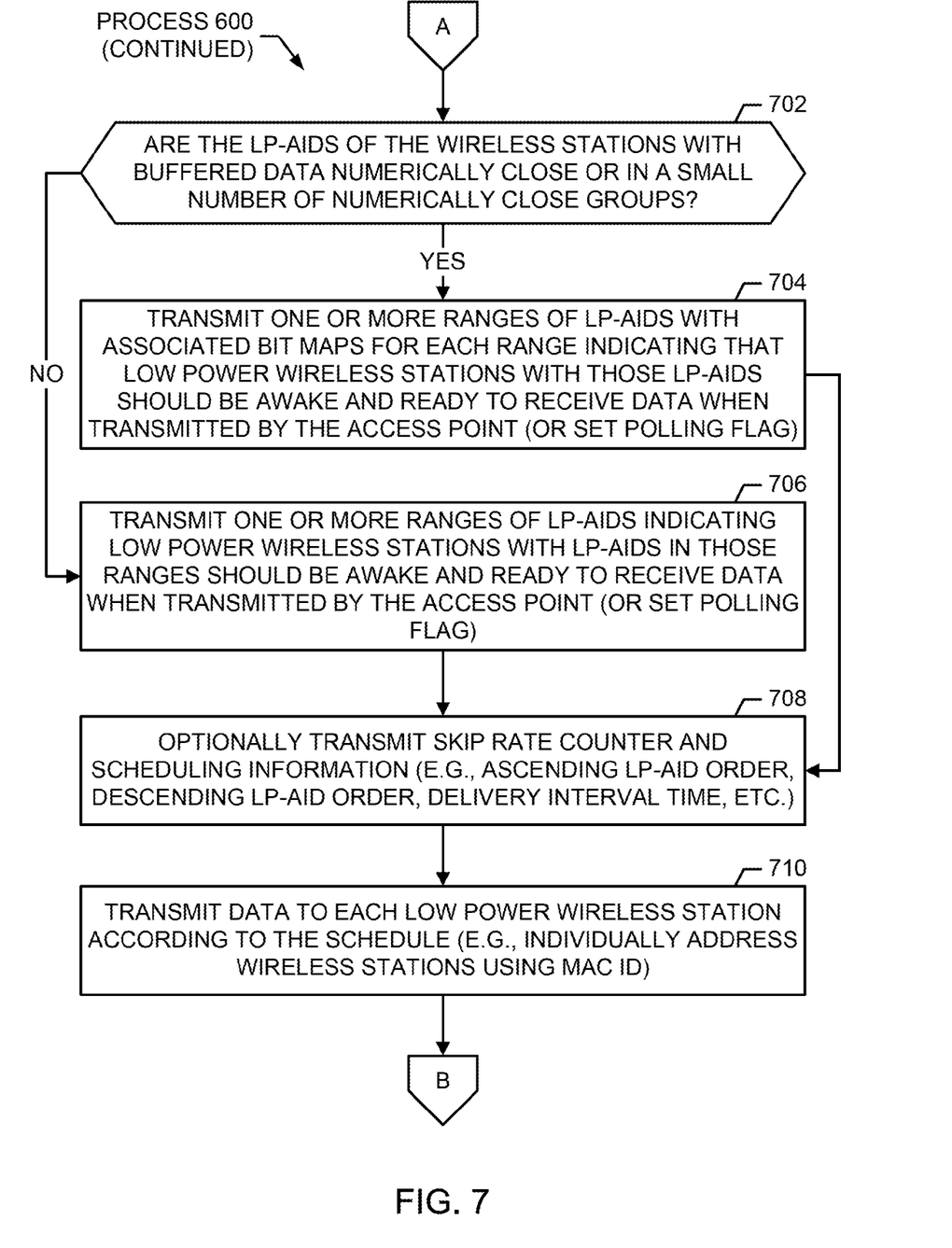

A flowchart of an example process 600 for delivering data to a wireless station 102 is illustrated in FIGS. 6 and 7. The process 600 may be carried out by one or more suitably programmed controllers or processors executing software (e.g., block 404 of FIG. 4). The process 600 may also be embodied in hardware or a combination of hardware and software according to the possibilities described above with reference to the access point 104. Although the process 600 is described with reference to the flowchart illustrated in FIGS. 6 and 7, it will be appreciated that many other methods of performing the acts associated with process 600 may be used. For example, the order of many of the operations may be changed, and some of the operations described may be optional.

In general, an access point 104 receives one or more low-power association requests and assigns each wireless station 102 a low-power association identifier ("LP-AID") and optionally a skip rate and offset. The access point 104 buffers data from an application server 106 for the wireless stations 102. The access point 104 maintains a skip-rate counter, which increments for each delivery period. For each such delivery period, the access point 104 selects those stations 102 which are expected to be awake by comparing the assigned skip rate and offset values to the skip-rate counter value and performing the modulo function. The access point 104 uses this list to select those stations 102 which have buffered data 212 available for delivery. If the number of selected wireless stations 102 with buffered data is less than a certain threshold, then the access point 104 transmits an explicit list of low-power association identifiers 222 indicating that each wireless station 102 with buffered data should poll for its data. If the number of wireless stations 102 with buffered data is not less than the threshold, then the access point 104 transmits one or more ranges of low-power association identifiers 222 along with associated optional bit maps or other suitable data indicating that those wireless stations 102 should be awake and ready to receive data when transmitted by the access point 104. Alternatively, the access point 104 may transmit a polling flag indicating that each such wireless station 102 should poll the access point 104 for its data. The access point 104 may also transmit scheduling information and transmit the buffered data according to the schedule.

More specifically, the example process 600 begins when an access point 104, or any other suitable device or system, receives one or more low-power association requests, which each contain an optional skip rate (block 602). In an example, multiple gas and water meters attempt to link to a particular access point 104. The gas meters optionally include in their association request a skip-rate value of 16. The access point 104 then assigns each low power wireless station 102 an LP-AID and optionally a skip rate and an offset value (block 604). The access point 104 increments the skip-rate counter for each delivery period (block 606). The assigned skip rate may be the value included in the request from the wireless station 102 or modified by the access point 104 (e.g., for load balancing). When a skip-rate value is assigned, a corresponding offset value may also be assigned. The offset value permits the access point 104 to distribute traffic over the delivery period of a given cycle. For example, the access point 104 may instruct many wireless stations 102 to wake up and check for buffered data on every eighth beacon but assigns different offset values (e.g., 0 to 7), so that those wake-up periods are spread out over different times.

In addition, the access point 104 may take the skip-rate skipping outcome into account when making assigning LP-AID values to devices 102. Its goal would be to keep the LP-AID values in a numerically close range for a given beacon in the skip cycle to permit the bitmap addressing approach to be as efficient as possible.

The access point 104 identifies one or more wireless stations 102 with buffer data from a server 106 where the associated skip rate and offset value synchronize with the skip-rate counter value (block 608). For example, if the skip-rate counter value is 67, then for wireless stations 102 with a skip rate of 8, select those with an offset value of 3. Before transmitting buffered data to the wireless stations 102, the access point 104 determines if the number of wireless stations 102 with buffered data is below a certain threshold (block 610). For example, the access point 104 may check if the number of wireless stations 102 with buffered data is less than fifty.

If the number of wireless stations 102 with buffered data at the access point 104 is less than the threshold, then the access point 104 transmits an explicit list of low-power association identifiers indicating that each wireless station 102 with buffered data should poll for its data (block 612). The access point 104 subsequently receives and services each polling request (block 614). For example, the access point 104 may send a firmware upgrade to a small number of gas meters.

If the number of wireless stations 102 with buffered data at the access point 104 is not less than the threshold, then the access point 104 determines if the low-power association identifiers of the wireless stations 102 with buffered data at the access point 104 are numerically close or in a small number of numerically close groups (block 702 of FIG. 7). If the low-power association identifiers are numerically close or in a small number of numerically close groups, then the access point 104 transmits one or more ranges of low-power association identifiers along with associated bit maps or other suitable data for each range indicating that wireless stations 102 with those low-power association identifiers should be awake and ready to receive data when transmitted by the access point 104 (block 704). Alternatively, the access point 104 transmits a polling flag indicating that each such wireless station 102 should poll the access point 104 for its data.

If the low-power association identifiers are not numerically close, then the access point 104 transmits one or more ranges of low-power association identifiers indicating wireless stations 102 with low-power association identifiers in those ranges should be awake and ready to receive data when transmitted by the access point 104 (block 706). Alternatively, the access point 104 transmits a polling flag indicating that each such wireless station 102 should poll the access point 104 for its data.

The access point 104 optionally transmits a skip-rate counter and scheduling information (block 708). For example, the access point 104 may indicate that it will be transmitting buffered data to wireless stations 102 in ascending order of low-power association identifier, descending order of low-power association identifier, a delivery interval time, or any other suitable scheduling information. In such an instance, the access point 104 transmits the buffered data to each wireless station 102 according to the schedule (block 710). For example, in one embodiment the schedule established by the access point 104 consists of start times beginning at multiples of the delivery interval. The position of the low-power association ID of a wireless station 102 within a list or range determines which multiple of the delivery interval corresponds to the potential start time of that wireless station 102 in the schedule. In one embodiment, the wireless station 102 listed first in the list or range is given a start time corresponding to the first multiple of the delivery interval. The second wireless station 102 in the list or range may be given a start time corresponding to the second multiple of the delivery interval, and so on. Typically, the product of the delivery interval and the number of wireless stations 102 in a list or range should be much less than the beacon interval of the access point 104. In some embodiments, the access point 104 provides a new delivery interval each time the access point 104 transmits a list or a range. In other embodiments, the access point 104 notifies wireless stations 102 during association which delivery interval to use when scheduling is enabled. In another embodiment, the access point 104 does not provide a delivery interval to wireless stations 102, so the access point 104 uses a default delivery interval equal to the beacon interval divided by the length of the list or the beacon interval divided by the total number of wireless stations 102 in the range transmitted by the access point 104. The access point 104 may begin delivering buffered data to a wireless station 102 any time after the scheduled start time for the wireless station 102, and the access point 104 is under no obligation to begin transmitting immediately at a scheduled start time, as the schedule is not intended to account for queuing delays or channel access delays that might normally occur.

Figure 8:
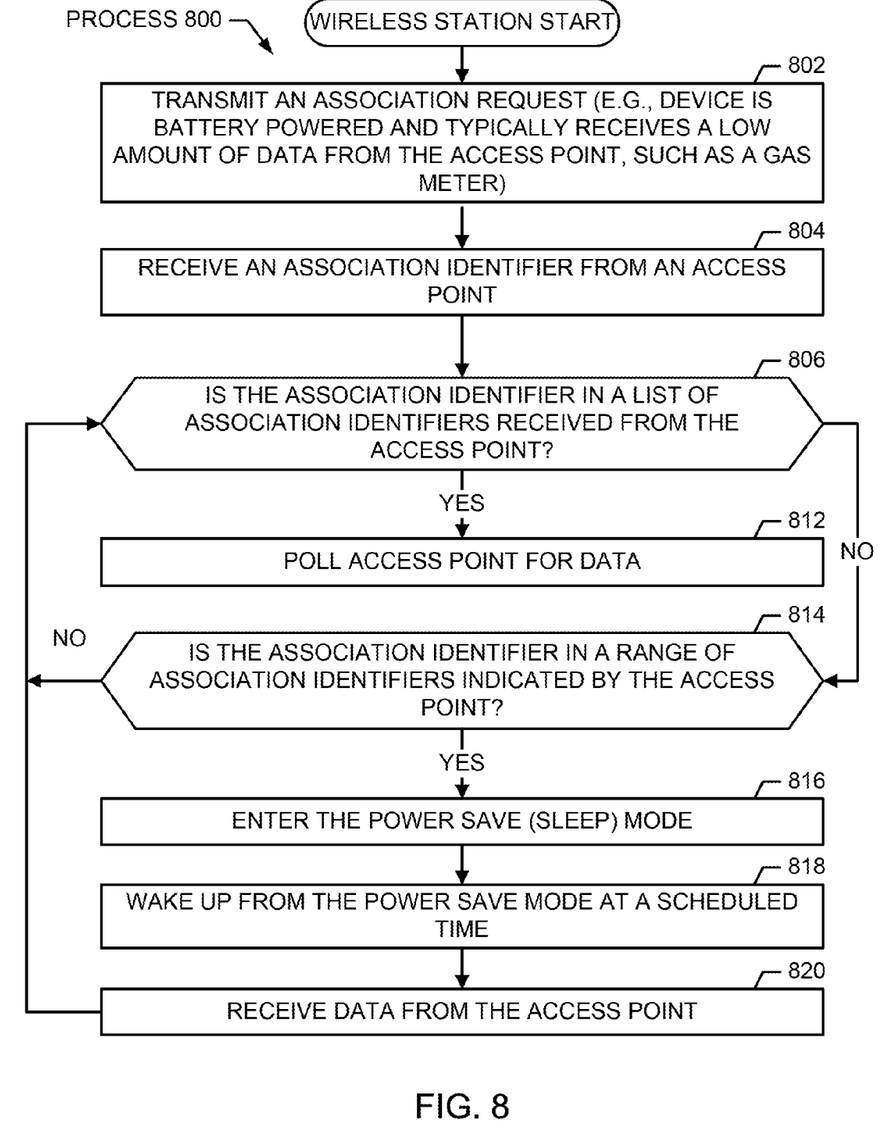
FIG. 8 is a flowchart of an example process for receiving data at a wireless station.

A flowchart of an example process 800 for receiving data at a wireless station 102 is illustrated in FIG. 8. The process 800 may be carried out by one or more suitably programmed controllers or processors executing software (e.g., block 404 of FIG. 4). The process 800 may also be embodied in hardware or a combination of hardware and software according to the possibilities described above with reference to the access point 104. Although the process 800 is described with reference to the flowchart illustrated in FIG. 8, it will be appreciated that many other methods of performing the acts associated with process 800 may be used. For example, the order of many of the operations may be changed, and some of the operations described may be optional.

In general, a wireless station 102 requests and receives an association identifier from an access point 104. Subsequently, the wireless station 102 may look for an indication that the access point 104 has buffered data for it based on the assigned association identifier. Accordingly, if the association identifier is in a list received from the access point 104, then the wireless station 102 polls the access point 104 for the buffered data. However, if the association identifier is in a range indicated by the access point 104, then the wireless station 102 enters a power save (sleep) mode to conserve battery power until a scheduled time when the buffered data for that wireless station 102 are being transmitted.

More specifically, the example process 800 begins when a wireless station 102, or any other suitable device or system, transmits an association request to an access point 104 (block 802). In an example, the wireless station 102 is a battery-powered device that typically receives a low amount of data from the access point 104, such as a gas meter. The wireless station 102 then receives its association identifier from the access point 104 (block 804). Subsequently, when the access point 104 needs to indicate that it has buffered data for one or more wireless stations 102, the access point 104 may transmit an explicit list of association identifiers (e.g., when the list is relatively short), or the access point 104 may transmit the boundaries of one or more ranges of association identifiers (e.g., when the list is relatively long).

Accordingly, if the association identifier associated with a wireless station 102 is in a list of association identifiers received from the access point 104 (block 806), then the wireless station 102 polls the access point 104 for the buffered data (block 812). In one embodiment, the wireless station 102 polls the access point 104 using a power-save poll message, wherein the power-save poll message includes a header indicating that a header-extension field is included in the message to transport the low-power association identifier from the wireless station 102 to the access point 104. The access point 104 uses the information in the header-extension field to determine a low-power association identifier for the polling station. If the association identifier associated with a wireless station 102 is in a range of association identifiers indicated by the access point 104 (block 814), then the wireless station 102 enters a power-save (sleep) mode (block 816) to conserve battery power until the buffered data for that wireless station 102 are being transmitted. For example, the range may include hundreds of wireless stations 102 each of which has buffered data. The wireless station 102 wakes up from the power-save mode at or before a scheduled time (block 818) in order to receive the buffered data from the access point 104 (block 820). The wireless station 102 calculates a scheduled wake-up time based upon information provided by the access point 104. For example, in one embodiment the access point 104 provides a delivery interval along with the range of association identifiers, and the wireless station 102 calculates its schedule wake-up time by multiplying the delivery interval by the number of wireless stations 102 in the range with buffered data plus one. In another embodiment, the wireless station 102 determines the delivery interval, and thereby determines its wake up schedule, by dividing the number of wireless stations 102 with buffered data by the beacon interval. As an example of how the order of some steps may be changed, it will be appreciated that the wireless station 102 may receive data from the access point 104 using this scheduled method (block 820) before the wireless station 102 receives data from the access point 104 using the polling method (block 812).

Figure 9:
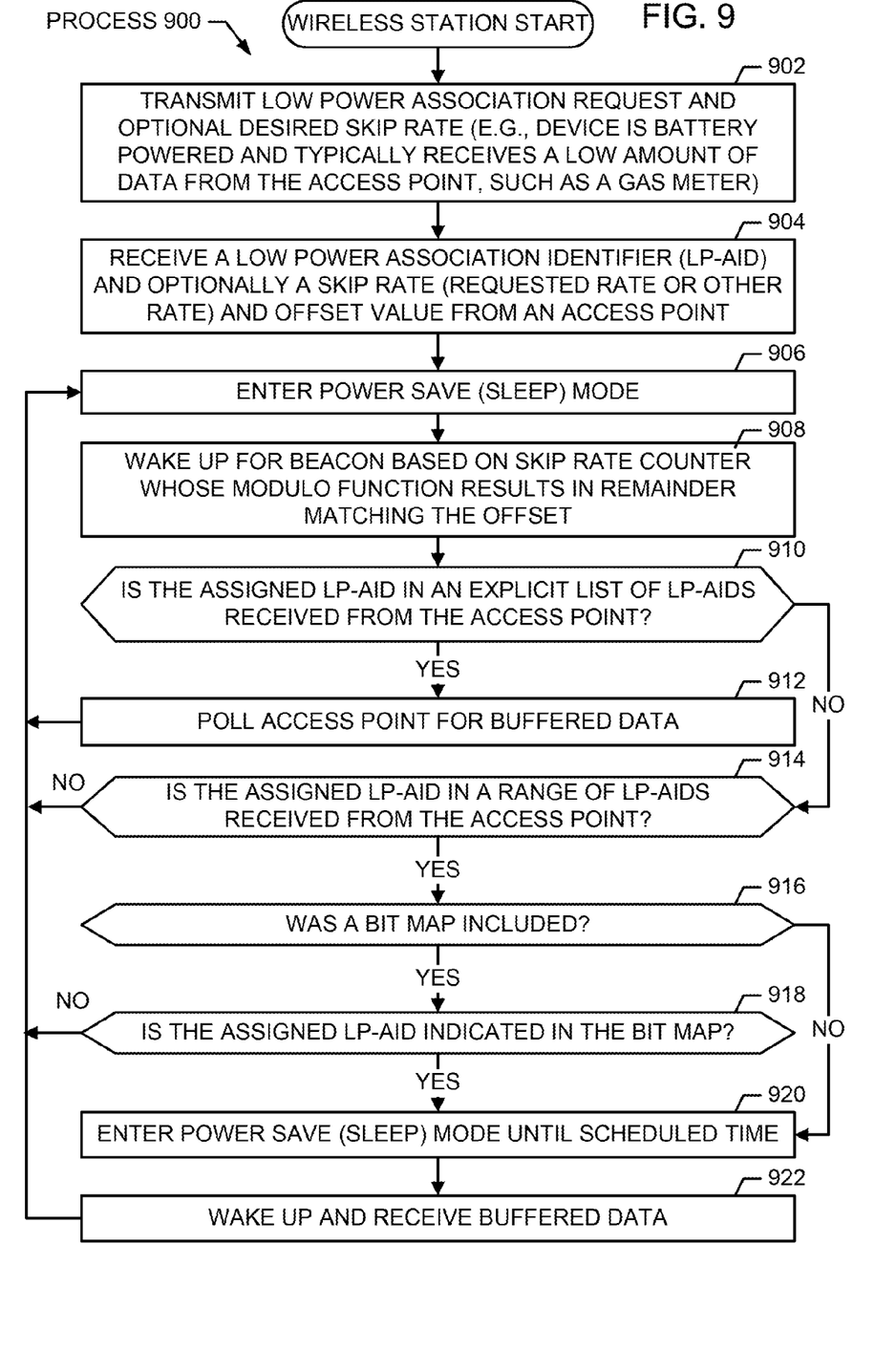
FIG. 9 is a flowchart of another example process for receiving data at a wireless station.

A flowchart of another example process 900 for receiving data at a wireless station 102 is illustrated in FIG. 9. The process 900 may be carried out by one or more suitably programmed controllers or processors executing software (e.g., block 404 of FIG. 4). The process 900 may also be embodied in hardware or a combination of hardware and software according to the possibilities described above with reference to the access point 104. Although the process 900 is described with reference to the flowchart illustrated in FIG. 9, it will be appreciated that many other methods of performing the acts associated with process 900 may be used. For example, the order of many of the operations may be changed, and some of the operations described may be optional.

In general, a wireless station 102 requests and receives a low-power association identifier and optionally a skip rate and offset value from an access point 104. The wireless station 102 then enters a power-save (sleep) mode to conserve battery power and periodically wakes up for a beacon with a skip-rate counter 218 from the access point 104 based on the assigned skip rate and offset value. If the association identifier is in an explicit list received from the access point 104, then the wireless station 102 polls the access point 104 for its buffered data. If the association identifier is in a range of association identifiers received from the access point 104, then the wireless station 102 determines if a bit map or other indication of what wireless stations 102 in the range actually have buffered data was also transmitted by the access point 104. If a bit map was transmitted, and it indicates that the wireless station 102 has buffered data at the access point 104, then the wireless station 102 enters a power-save (sleep) mode until a scheduled time when the wireless station 102 wakes up and receives the buffered data.

More specifically, the example process 900 begins when a wireless station 102, or any other suitable device or system, transmits a low-power association request and optionally a desired skip rate (block 902). In response, the wireless station 102 receives a low-power association identifier and optionally a skip rate and offset value from the access point 104 (block 904). The skip rate may be a rate requested by the wireless station 102 or some other suitable rate determined by the access point 104 (e.g., based on load balancing).

The wireless station 102 then enters a power-save (sleep) mode to conserve battery power (block 906). Subsequently, the wireless station 102 wakes up for a beacon from the access point 104 at a time that is optionally based on the broadcast skip-rate counter 218 and the skip rate and offset value assigned to the wireless station 102 (block 908). At some point, when the wireless station 102 is awake, the access point 104 may transmit an explicit list of association identifiers or a range of association identifiers to indicate that those wireless stations 102 have buffered data at the access point 104.

If the association identifier assigned to the wireless station 102 is in an explicit list of association identifiers received from the access point 104 (block 910), then the wireless station 102 polls the access point 104 for its buffered data (block 912). If the association identifier assigned to the wireless station 102 is in a range of association identifiers received from the access point 104 (block 914), then the wireless station 102 determines if a bit map or other indication of what wireless stations 102 in the range actually have buffered data was also transmitted by the access point 104 (block 916). If the bit map or other indication was transmitted by the access point 104, then the wireless station 102 determines if the access point 104 has buffered data for it based on the bit map (block 918). If the access point 104 has buffered data for the wireless station 102, then the wireless station 102 enters a power-save (sleep) mode until a scheduled time (block 920). At or before the scheduled time, the wireless station 102 wakes up and receives the buffered data (block 922).

In summary, persons of ordinary skill in the art will readily appreciate that methods and apparatus for delivering data to a wireless station have been provided. Among other advantages, transmitting a range of association identifiers when the number of wireless stations with buffered data at the access point is large allows the wake up message to be short, thereby conserving battery power because the wireless stations do not need to stay awake for a long list of explicit association identifiers. Conversely, transmitting an explicit list of association identifiers when the number of wireless stations with buffered data is short conserves battery power for wireless stations that may be captured by a range but do not actually have buffered data at the access point. By using skip rates and offset values, not only does the wireless station 102 have an ability to sleep over longer periods of time, but the access point 104 is able to perform load balancing over its available delivery periods.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The invention claimed is:

1. A method of delivering data to wireless stations, the method comprising:
    receiving a plurality of association requests from a plurality of wireless stations wherein the plurality of association requests include low-power association requests and non-low-power association requests;
    transmitting a different association identifier to each of the plurality of wireless stations;
    transmitting a skip rate indicative of a wake-up frequency associated with at least one of the plurality of wireless stations;
    transmitting a delivery interval time indicative of a time between a transmission of first buffered data associated with a first wireless station and a transmission of second buffered data associated with a second wireless station;
    buffering data for a subset of the plurality of wireless stations, the subset including a number of wireless stations;
    if the number of wireless stations is less than a threshold, then transmitting a list of association identifiers indicating that each wireless station identified by the list is to poll for an associated portion of the buffered data;
    if the number of wireless stations is greater than the threshold, then transmitting data indicative of a range of association identifiers indicating that each wireless station identified by the range is to wake up at a scheduled time to receive an associated portion of the buffered data; and
    transmitting an indication that at least one wireless station in the range need not wake up at the scheduled time to receive buffered data.

* * * * *